US00RE41262E

(19) United States
(12) Reissued Patent
Ricco

(10) Patent Number: US RE41,262 E
(45) Date of Reissued Patent: Apr. 27, 2010

(54) ON-OFF VALVE FOR A GAS INJECTION SYSTEM, PARTICULARLY OF METHANE, FOR INTERNAL COMBUSTION ENGINES

(75) Inventor: Mario Ricco, Cassamassima (IT)

(73) Assignee: CRF Societa Consortile per Azioni, Orbassano (Torino) (IT)

(21) Appl. No.: 11/121,330

(22) Filed: May 4, 2005

Related U.S. Patent Documents

Reissue of:
(64) Patent No.: 6,666,193
Issued: Dec. 23, 2003
Appl. No.: 10/079,856
Filed: Feb. 22, 2002

(30) Foreign Application Priority Data

Feb. 23, 2001 (IT) ..... TO2001A0160

(51) Int. Cl.
*F02M 57/06* (2006.01)

(52) U.S. Cl. ..... 123/527; 123/511; 123/458; 123/529

(58) Field of Classification Search ..... 123/527, 123/529, 198 D, 198 DB, 447, 456–458, 123/510–511; 251/129.15, 129.21
See application file for complete search history.

(56) References Cited

U.S. PATENT DOCUMENTS

| | | | | | |
|---|---|---|---|---|---|
| 2,693,929 | A | | 11/1954 | Hart | |
| 3,796,409 | A | | 3/1974 | Burchhardt et al. | |
| 4,399,944 | A | | 8/1983 | Krauss et al. | |
| 5,150,690 | A | * | 9/1992 | Carter et al. | 123/527 |
| 5,531,199 | A | * | 7/1996 | Bryant et al. | 123/527 |
| 5,546,908 | A | * | 8/1996 | Stokes | 123/480 |
| 5,584,467 | A | * | 12/1996 | Harnett et al. | 251/129.07 |
| 5,615,655 | A | * | 4/1997 | Shimizu | 123/527 |
| 5,623,907 | A | * | 4/1997 | Cotton et al. | 123/456 |
| 5,632,250 | A | * | 5/1997 | Kato et al. | 123/490 |
| 5,671,711 | A | * | 9/1997 | Collie | 123/299 |
| 5,738,076 | A | * | 4/1998 | Kim | 123/527 |
| 5,899,194 | A | * | 5/1999 | Iwatsuki et al. | 123/527 |
| 6,289,930 | B1 | * | 9/2001 | Simon | 137/601.14 |
| 6,298,833 | B1 | * | 10/2001 | Douville et al. | 123/527 |
| 6,427,670 | B2 | * | 8/2002 | Goto et al. | 123/529 |
| 6,578,560 | B2 | * | 6/2003 | Ricco | 123/527 |
| 6,666,193 | B2 | * | 12/2003 | Ricco | 123/527 |
| 6,792,920 | B2 | * | 9/2004 | Niimi et al. | 123/457 |
| 7,036,491 | B2 | * | 5/2006 | Ricco et al. | 123/527 |
| 7,069,917 | B2 | * | 7/2006 | Ricco et al. | 123/527 |
| 7,073,490 | B2 | * | 7/2006 | Ricco et al. | 123/527 |
| 7,100,581 | B2 | * | 9/2006 | Ricco et al. | 123/529 |
| 7,140,354 | B1 | * | 11/2006 | Hashemi | 123/456 |

FOREIGN PATENT DOCUMENTS

| | | | |
|---|---|---|---|
| DE | 42 05 887 | A | 9/1993 |
| GB | 2060827 | * | 5/1981 |
| GB | 2 136 499 | A | 9/1984 |
| SU | 507704 | * | 4/1976 |

* cited by examiner

*Primary Examiner*—Hai H Huynh
(74) *Attorney, Agent, or Firm*—Sughrue Mion, PLLC

(57) ABSTRACT

On-off valve intended to be arranged at the outlet of the gas accumulation reservoir in an electronic gas injection system for an internal combustion engine, presenting a valve member made of metallic material, co-operating with a valve seat made in a body, which is also made of metallic material, to ensure the good quality of tightness in all operative temperature and pressure conditions, with prolonged reliability in time.

4 Claims, 3 Drawing Sheets

ON-OFF VALVE FOR A GAS INJECTION SYSTEM, PARTICULARLY OF METHANE, FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

The invention relates to gas injection systems, particularly of methane, for internal combustion engines, for the type comprising:

- a plurality of electromagnetically controlled injectors, associated to the various cylinders in the engine,
- a distributing manifold or rail communicating with said injectors,
- a feeding reservoir of the distributing manifold where pressurised gas is accumulated,
- a pressure regulating valve interposed in the connection between the reservoir and said distribution manifold,
- an electronic control unit set up to control the injectors and to control the opening time to meter the amount of gas injected in each cylinder according to the operating conditions of the engine and,
- an on-off valve arranged on the output of the reservoir.

The on-off solenoid valve complies with standards in force and ensures the possibility of hermetically closing the reservoir in any emergency condition, for example in the case of an accident entailing leakage of gas into the tubes located downstream to the reservoir.

The on-off valves used to date in systems of the type specified above use a deformable metallic material valve member, typically made of synthetic rubber, with consequent problems of tightness when cold. The use of plastic material valve members is consequently not advantageous, because there is the risk of the material forming the valve member being cut or sheared consequent to the pressure with which it is pressed against the corresponding valve seat, which again causes problems of tightness.

SUMMARY OF THE INVENTION

The object of the invention is to realise an on-off valve of the perfected type for use in gas injection systems of the type described above, which guarantees good tightness quality in all conditions of operation and particularly at all operating temperatures.

To obtain this object, the invention relates to a system of the type described in the preamble, characterised in that said on-off valve comprises a metallic material valve member, co-operating with a valve seat, also made of metallic material, and a solenoid to recall the valve member to an open condition against the action of elastic means.

The use of the metal-to-metal contact of the valve according to the invention ensures a fixed geometry of the valve in all operative conditions and, particularly, and at any operating temperature and pressure value.

In a practical embodiment of the invention, said valve member presents a ball conformation and the co-operating valve seat presents an impression defining an annular portion of spherical surface formed in a tapered portion of a gas outflow conduit.

According to an additional characteristic of the invention, the valve member is recalled to the closed condition by a spring tending to push it in the same direction as the flow of gas from reservoir.

The impression forming the valve seat can be obtained by coinage in the metallic side of said conduit for by machining with a hard metal rotary tool.

The valve geometry can be predetermined so that the valve also acts as a flow limiting valve for automatically cutting off the flow of gas if the delivery tends to increase over a certain value following a leak downstream to the reservoir, for example, due to the breakage of a tube caused by an accident. For this purpose, the solenoid valve is suited to apply a force of attraction on the valve member which is higher in a first phase, in order to cause the detachment of the valve member from its seat, and lower in a second subsequent phase to keep the valve member open. During this phase, a flow of gas exceeding a predetermined threshold is thus capable of overcoming the relatively low attraction of the solenoid. Said result can be obtain by varying the power current of the solenoid and/or by suitably shaping the windings in the various areas of the solenoid.

BRIEF DESCRIPTION OF THE DRAWINGS

Additional characteristics and advantages of the invention will now be described, by the way of example only, with reference to the accompanying drawings wherein.

DETAILED DESCRIPTION OF THE INVENTION

Figure 1:
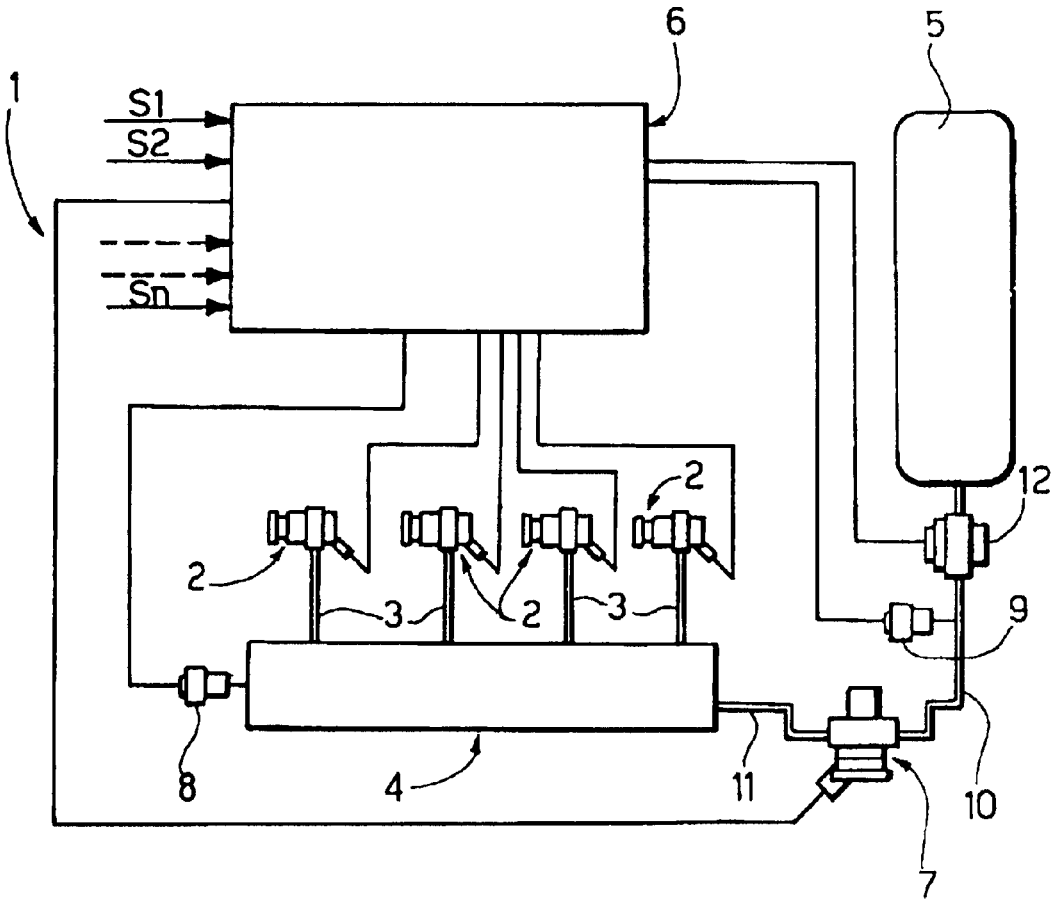
FIG. 1 illustrates a diagram of a methane injection system for internal combustion engine utilising an on-off valve according to the invention.

With reference to FIG. 1, numeral 1 generically indicates a methane electronic injection system for an internal combustion engine. The system comprises a plurality of electromagnetically controlled injectors (or injection valves) 2 associated to the various cylinders in the engine. The assembly details of the injectors 2 are neither described nor illustrated herein, because the injectors can be made in any way according to prior art and because the details are not included in the object of the invention. The injectors 2 receive the methane via the respective lines 3 from a distributing manifold, or rail, 4. The distributing manifold 4 in turn receives the methane from a reservoir 5 where the high pressure methane is accumulated (e.g. at a pressure in the order of 200 bars). The control solenoids of the injectors 2 are controlled by an electronic control unit 6 on the basis of the signals $S_1, S_2, \ldots, S_n$, indicative of the various parameters of operation of the engine, including the position of the accelerator pedal, the speed of revolution of the engine, the ambient temperature, the altitude, etc. A pressure regulating valve 7, which is also controlled by the control unit 6, is interposed in the connection between the reservoir 5 and the distributing manifold 7. The control unit 6 also receives the signals output by the pressure sensors 8, 9 indicative of the pressure existing in the distributing manifold 4 and in the line 10 connecting the reservoir 5 to the pressure regulating valve 7, respectively. The latter reduces the pressure of the gas to the existing value in the reservoir 5 to the value existing in the manifold 4, which is connected to the valve 7 via the line 11. The system illustrated in the drawing is the object of prior Italian patent application T02000A001099 filed by the Applicant on Feb. 24, 2000 and secret on the filing date of this application. In this system, the pressure regulating device 7 is controlled by the control unit 6 to vary the pressure of the gas in the distribution manifold 4 according to the signals output by the sensors 8, 9 to obtain a pressure value in the distribution manifold which is predetermined according to the operative parameters of the engine.

Despite that the example herein illustrated is referred to the system previously proposed by the Applicant, it must be stressed that the invention is applicable in general to any electronic gas injection system for an internal combustion engine, and consequently to diffuse systems from the one described in the Applicant's present Patent Application.

Specifically, the system 1 also comprises a second technique known per se, i.e. an on-off valve 12, which is also controlled by the control unit 6 to entirely cut off the output of the reservoir 5 in emergency conditions.

Figure 2:
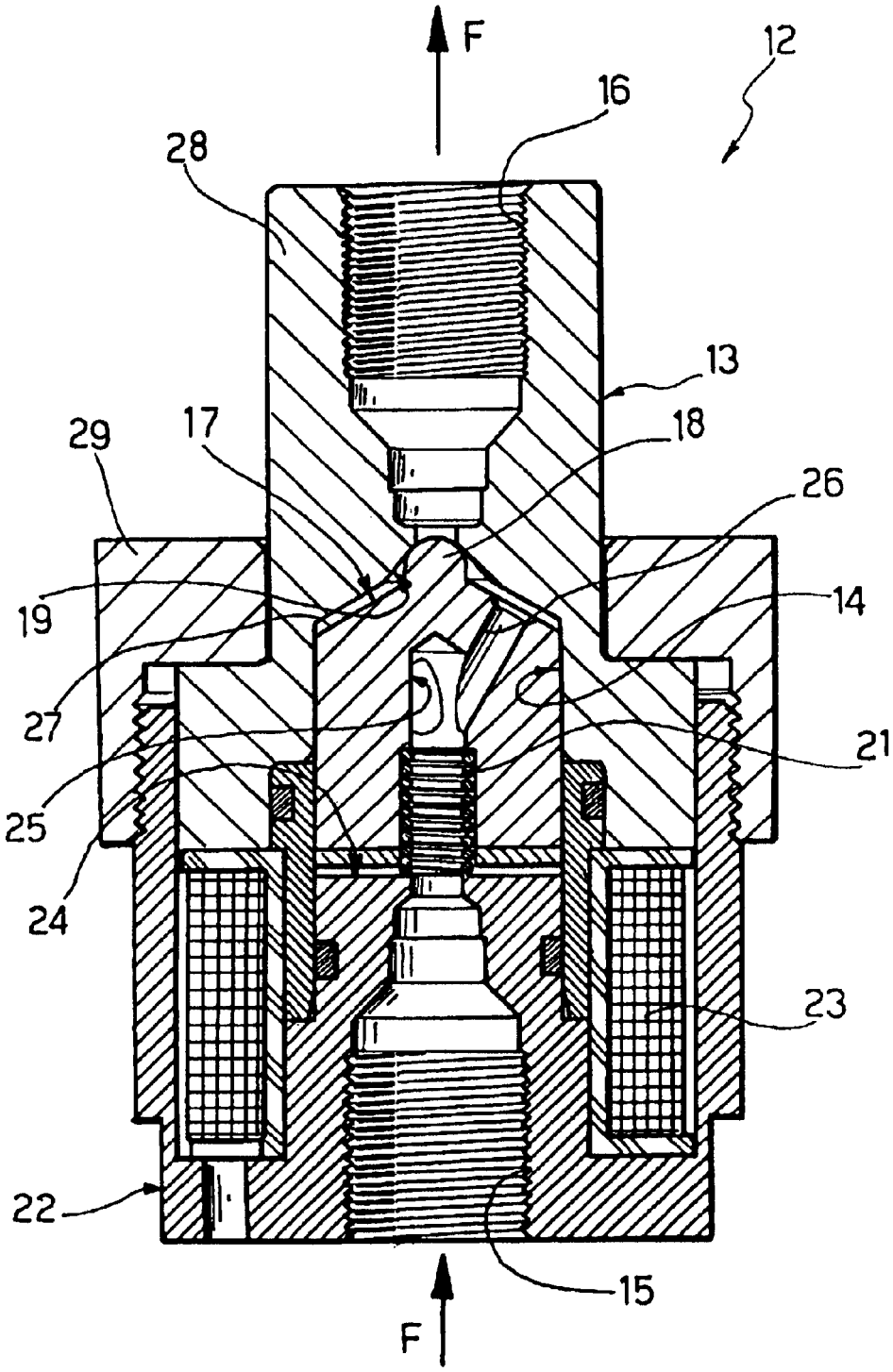
FIG. 2 shows a blown-up cross-sectional view of a preferred embodiment of the valve according to the invention.

FIG. 2 illustrates a preferred form of embodiment of the valve 12 according to the invention. In this example, the valve comprises a body 13 with an internal cavity 14 for putting an input passage 15, intended to be connected to the output of the reservoir (the flow of gas of the valve is indicated by the arrows F) into communication with an output passage 16, intended to be connected to the tube 10 connected to the pressure regulating device 7.

A cylindrical piston 17 of metallic material with a spherical surface end nose 18, forming the valve member of the valve, is slidingly mounted in the cavity 14. The valve member 18, which is made of metallic material (typically steel), co-operates with a valve seat also made of steel, formed in a tapered position 19 of a conduit putting the cavity 14 into communication with the output passage 16.

Figure 3:
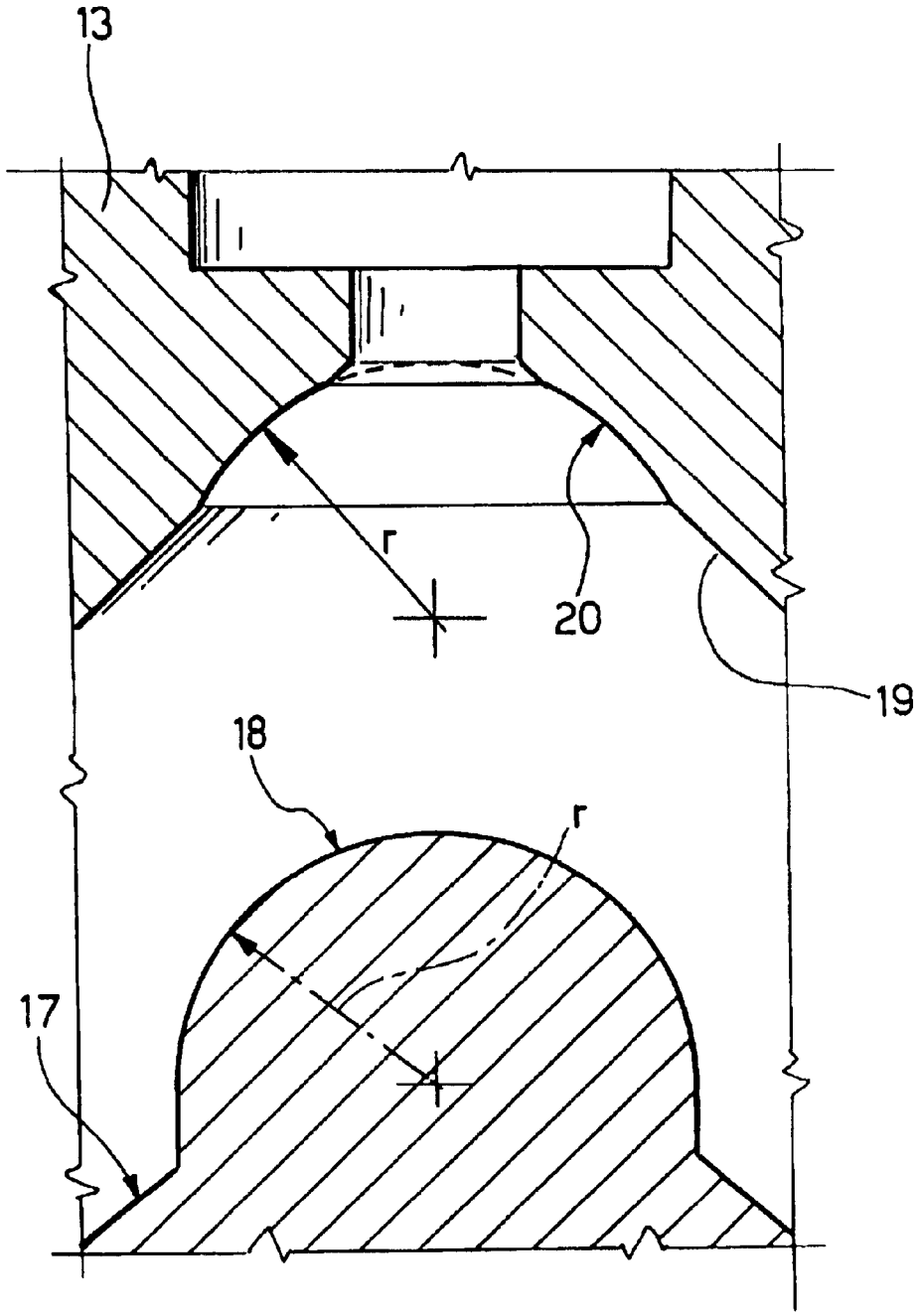
FIG. 3 illustrates a blow-up on a detail in FIG. 2.

As appears in the detail in FIG. 3, showing the valve member 18 in the open position, the valve seat co-operates with a valve member 18 comprising a recess 20 defining an annular portion of spherical surface, whose radius r is essentially equal to the radius r of the spherical valve member 18.

The valve member 18 is pressed against the seat of the valve 20 by a coil spring 21 operatively interposed between the piston 17 and an end element 22, which defines the input passage 15, presenting a circumferential groove acting as a seat for the solenoid 23 of the solenoid valve. When the solenoid 23 is energised, the piston 17 is pushed into contact with an end surface 24 of the element 22 against the action of the spring 21. In this condition, the input gas in the passage 15 flows in the output passage 16 through an axial hole 25 in the piston 17, from where several holes 26 lead into a chamber 27, delimited by a piston 17 communicating with the output passage 16.

In the example shown, the portion of the body 13 where the sliding cavity 14 of the piston 17 is formed is made of a separate element 28, in which the output passage 16 is also formed. The element 28 is withheld against the element 22 by an annular lid 29, which is screwed onto the element 22 so that the solenoid 23 remains locked in the circumferential groove of the element 22 by the element 28. Obviously, the construction details are herein provided by the way of a non-limiting example and do not restrict the scope protection of the invention.

As appears in the description above, the basic concept of the invention is that of an on-off valve for an electronic gas injection system, in which both the valve member 18 and the co-operating valve seat 20 are made of metallic material elements. The metal-to-metal contact ensures the good quality of the tightness in any operative condition, thanks to the stability of its geometry in any temperature and pressure value.

As illustrated above, the annular groove 20 forming the valve seat can be made by coinage or by machining by means of a hard metal rotary tool.

Furthermore, as previously indicated, the valve can be predisposed so that the solenoid 23 applies an attraction force to the valve member 18 which is higher in a first interval of determined time to allow the detachment of the valve member in its seat and lower during a second phase only to keep the valve member open. In this way, if the flow of gas through the open valve exceeds a predetermined threshold valve, for example due to leakage of the tubes downstream to the valve, the geometry of the valve will generate a drop of pressure through the passage 19 which overcomes the attraction of the solenoid and causes the valve to close again. In this way, the valve according to the invention also acts as a flow limiting valve. This effect can be obtained also because the spring 21 pushes the valve member in the same direction of flow of the gas from the reservoir.

Moreover, numerous changes can be implemented to the construction and embodiments of the invention herein envisaged without departing from the scope of the present invention, as defined by the following claims.

What is claimed is:

1. Gas injection system, particularly of methane, for internal combustion engine, comprising:

a plurality of electromagnetically controlled injectors, associated to the various cylinders in the engine, a distributing manifold or rail communicating with said injectors, a feeding reservoir of the distributing manifold where pressurised gas is accumulated, a pressure regulating valve interposed in the connection between the reservoir and said distribution manifold, an electronic control unit set up to control the injectors and to control the opening time to meter the amount of gas injected in each cylinder according to the operating conditions of the engine and, an on-off valve arranged on the output of the reservoir, comprising:

a valve member, co-operating with a valve seat,

*spring means tending to push said valve member in the same direction as the flow of gas from said reservoir, towards a closed condition in contact with said valve seat,* and a solenoid *which can be energized* to recall the valve member to an open condition *spaced apart from said valve seat,* against the action of [elastic] *said spring* means, wherein said valve member [(18)] is made of metallic material and in that said valve seat is made in a metallic material body*, and* wherein said solenoid is suited to apply a *first higher* force of attraction on the valve member [which is higher] in a first phase of predetermined duration, in order to cause the detachment of the valve member from its seat, and *a second force of attraction on the valve member, which is* lower *than said first force of attraction,* in a second subsequent phase to keep the valve member open, so that in the case of excessive flow of gas due to leakage in the tubes downstream with respect to the on-off valve, the valve member will close and also act as a flow limiting valve.

2. System according to claim 1, wherein said valve member presents a spherical conformation and the valve seat co-operating therewith consists of an impression defining an annular portion of spherical surface.

[3. System according to claim 1, wherein said valve member is recalled to the closed condition by a spring tending to push it in the same direction as the flow of gas from reservoir.]

*4. An on-off valve arranged at the outlet of a gas accumulation reservoir, comprising:*

*a valve member cooperating with a valve seat,*

*spring means tending to push said valve member in the same direction as the flow of gas from said reservoir towards, a closed condition in contact with said valve seat, and*

*a solenoid which can be energized for recalling said valve member to an opened condition spaced apart from said valve seat, against the action of said spring means,*

*wherein said valve member is made of metallic material and said valve seat is made in a body which is made of metallic material,*

*wherein said solenoid is suited to apply a first higher force of attraction on the valve member in a first phase of predetermined duration, in order to cause the detachment of the valve member from its seat, and a second force of attraction on the valve member, which is lower than said first force of attraction, in a second subsequent phase, to keep the valve member open, so that in the case of excessive flow of gas due to leakage in the tubes downstream with respect to the on-off valve, the valve member will close and also act as a flow limiting valve.*

*5. The on-off valve according to claim 4, wherein said valve member presents a spherical conformation and the valve seat co-operating therewith consists of an impression defining an annular portion of spherical surface, formed in a tapered portion of the gas outflow conduit.*

* * * * *